Feb. 24, 1925.                                                          1,527,258
A. W. LIEBERMAN
TRACTOR AND TRAILER BRAKE COUPLING
Filed April 23, 1921                    2 Sheets-Sheet 1
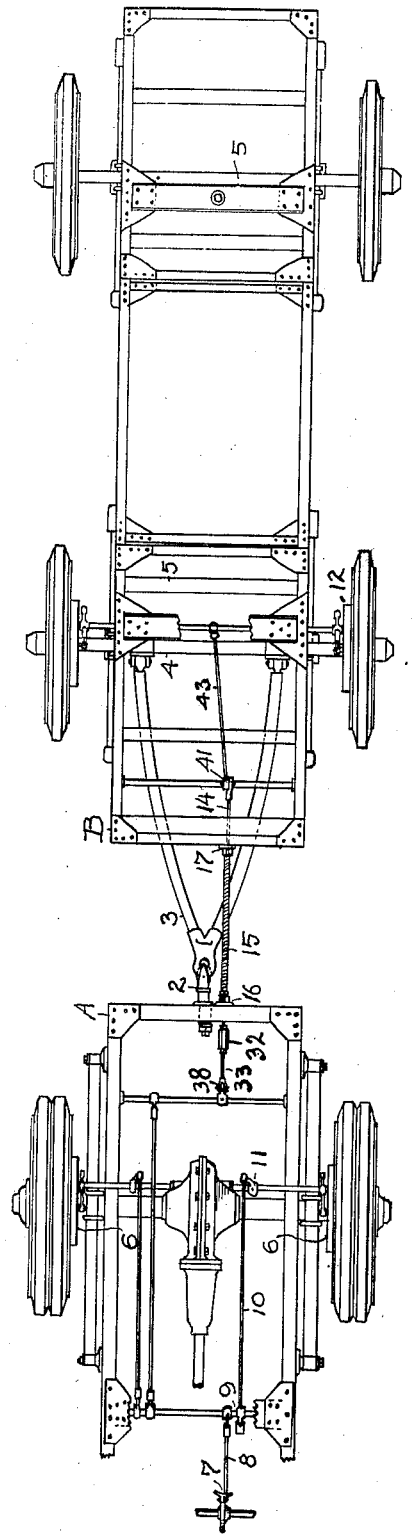
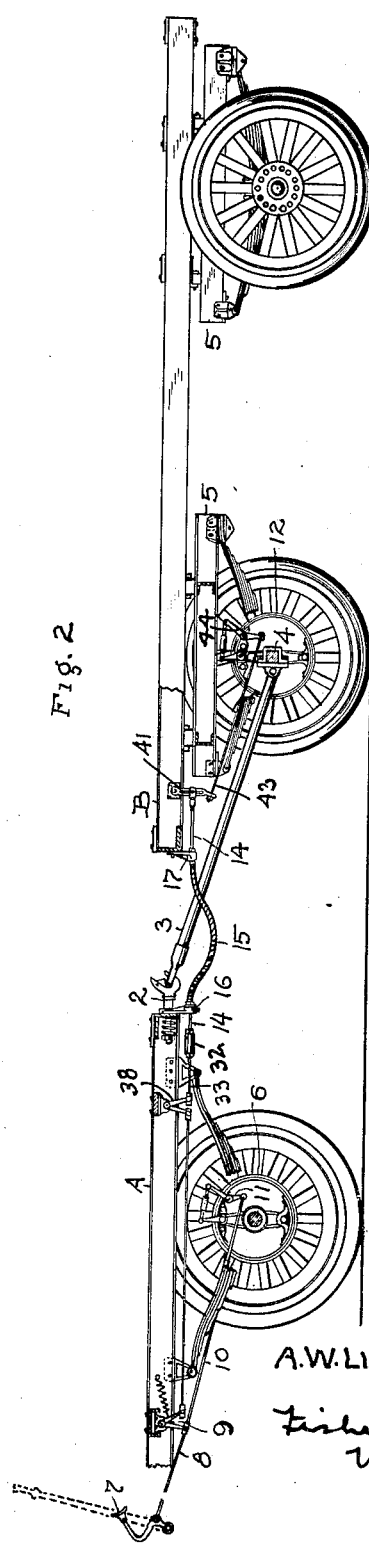
Inventor
A.W. LIEBERMAN
Fisher & Moser
Attorneys

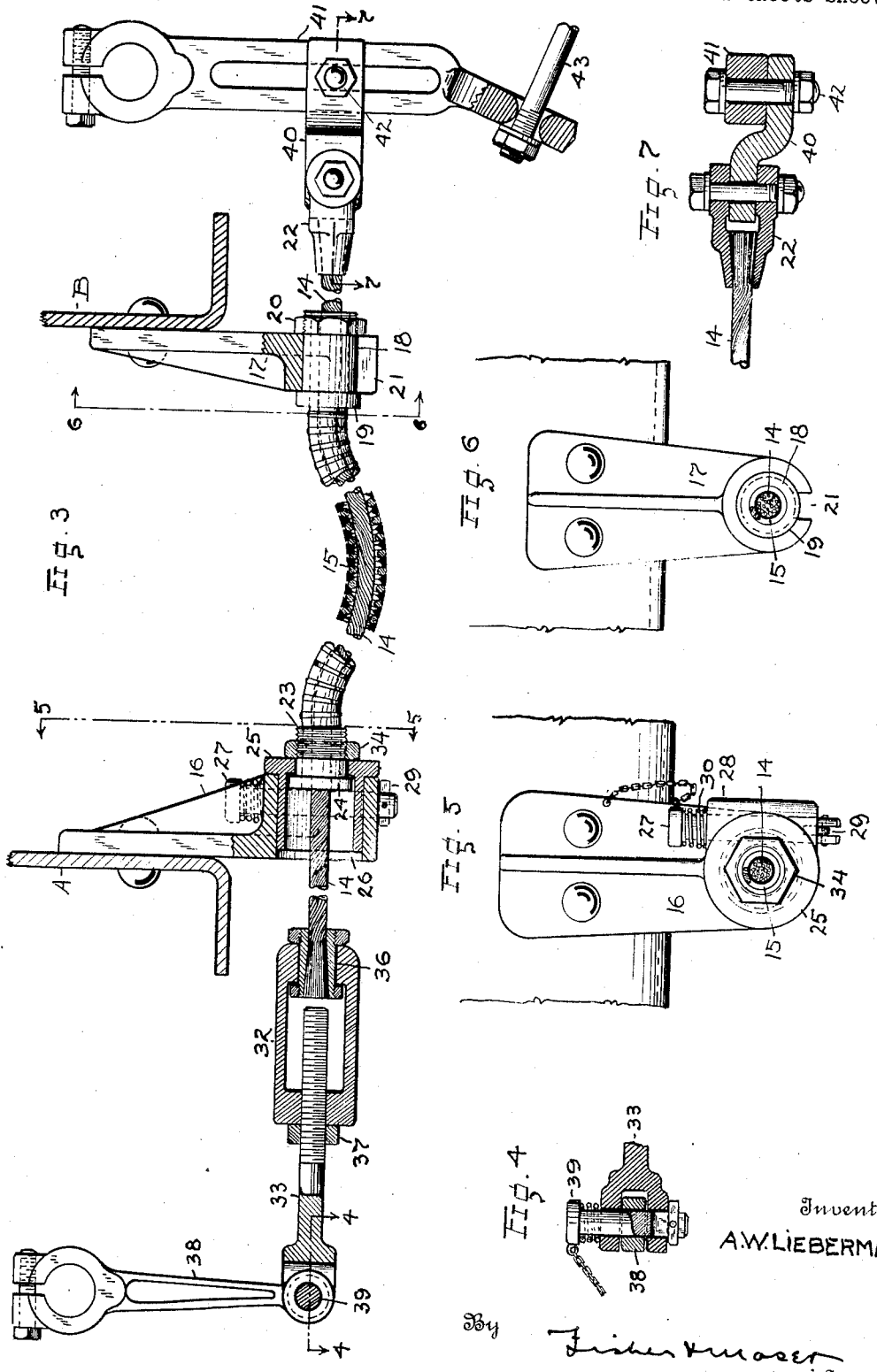

Patented Feb. 24, 1925.

1,527,258

UNITED STATES PATENT OFFICE.

ADOLPH W. LIEBERMAN, OF CLEVELAND, OHIO.

TRACTOR AND TRAILER BRAKE COUPLING.

Application filed April 28, 1921. Serial No. 465,202.

*To all whom it may concern:*

Be it known that I, ADOLPH W. LIEBERMAN, a citizen of the United States, residing at Cleveland, in the county of Cuyahoga and State of Ohio, have invented certain new and useful Improvements in a Tractor and Trailer Brake Coupling, of which the following is a specification.

The present invention has been evolved to provide an exceptionally simple and effective coupling between a tractor and a trailer whereby an operating part on the trailer, such as the brake, may be controlled at all times by the operator of the tractor regardless of the turning or tilting movements of the trailer in respect to the tractor or the change in elevation of the parts on the trailer under varying loads. The invention as exemplified herein, comprises a flexible tube and a flexible pulling element extending through the tube, together with special mountings and connections adapting said parts to be attached to a tractor and a trailer in working connection with the brakes or brake operating mechanisms on said tractor and trailer, all as hereinafter shown and described and more particularly pointed out in the claims.

In the drawings accompanying this application, Fig. 1 is a plan view of a rear portion of a tractor or truck and a trailer connected therewith and showing my improved coupling uniting the brake operating parts. Fig. 2 is a side elevation and sectional view of the tractor and trailer and parts shown in Fig. 1. Fig. 3 is an enlarged view, partly in section and partly in elevation of the cooperating parts of my invention, but with portions broken away to permit all the working parts to be delineated on the sheet. Fig. 4 is a detailed sectional view on the line 4—4, of Fig. 3 showing the detachable coupling pin for the turn buckle screw. Fig. 5 is an end elevation and cross section on line 5—5 of Fig. 3 showing the supporting bracket for the coupling on the tractor. Fig. 6 is a cross section and front elevation on line 6—6 of Fig. 3 showing the slotted bracket on the trailer. Fig. 7 is a horizontal section on line 7—7 of Fig. 3 showing the adjustable connecting members between the operating cable and the brake rod for the trailer.

As shown herein the rear end of tractor or other pulling vehicle A is equipped with a draw bar coupling 2, and the trailer B has a tongue or yoke 3 attached to its front axle 4 and detachably connected with draw bar 2. The frame of the trailer is mounted on turn tables 5 in the present instance, although the invention is applicable to any form of tractor and trailer or a plural number of trailers having draw bar or coupling means which fix their working relation and permit turning and accommodating movements in traveling over the road. The clutches or brakes 6 of the tractor are controlled in the usual way by a foot pedal or lever 7, links 8, and the usual equalizing shafts and arms 9 and rods 10 which extend to the clutches or brake parts 11 according to the specific kind or construction found in any given truck or traction vehicle. Trailer B is also provided with braking mechanism 12 of any suitable kind or make for the front or rear wheels or both whereby the trailer may be checked and controlled in its travel, and joint operation of the brakes for both the tractor and the trailer is placed under the positive control of the operator of the tractor or pulling vehicle by coupling the braking parts together by a flexible wire, chain or cable 14 which is flexed between the two vehicles and held taut by a compensating coupling tube or counteracting member 15. This coupling and counteracting device is in swiveled union with separate brackets 16 and 17 depending from the rear and front ends of the respective frames of the tractor and trailer, and member 15 is flexible and of such length that it extends on curved lines between the tractor and trailer when these vehicles travel in a straight line or on a straight course. The portion of cable 14 which extends through the tube is also flexed or curved in substantially the same degree as the tube and both the cable and the tube flex and straighten in corresponding degree when the tractor and trailer travel around a curve or ride over unequal surfaces. The length of tube 15 and that flexed portion of cable 14 within the tube corresponding to the flexed length of the tube remains constant or unchangeable in the turning or tilting movements of the two vehicles because the opposite ends of said tube and cable are both anchored or united with parts mounted upon the frames of said vehicles. Assuming cable 14 to be taut as in actual operations the tendency under pull on the cable is to straighten the flexed portion thereof within the tube, but this is counteracted and absolutely prevented by the stiff wire tube inasmuch as the opposite ends of the tube are anchored or held against end movement by the brackets and frames. In brief, cable 14 cannot straighten itself unless the tube is also permitted to straighten itself and the only change of flexure in the cable and tube is during the turning or up and down movements of the two vehicles and then the flexure in these parts is equal. The length of tube 15 need only be such that sufficient slack be given to accommodate the turning movements of the two vehicles, and the preferred form of tube is one comprised of tightly coiled wire, either single or plural turns of wire of ample gauge and strength to resist the wear and pulling strains imposed upon the tube by the cable in operations.

Each end of tube 15 is preferably connected in detachable swiveled union directly or indirectly with brackets 16 and 17. Thus, bracket 17 has a round horizontal opening therein adapted to receive a round cylindrical coupling member 18 having an annular shoulder 19 adapted to bear against the front side of the bracket, and member 18 is removably held in place upon the bracket by a nut 20 screwed upon the outer threaded end thereof. The length of the screw thread on member 18 is such that nut 20 will not clamp said member upon the bracket but will permit it to rotate or swivel therein, and inasmuch as tube 15 is rigidly united with member 18 said tube is free to turn within the bracket and will not twist within its length. A vertical slot 21 in the bottom side of bracket 17 permits cable 14 to be slipped into or out of the opening in the bracket in assembling or disassembling operations, especially where a yoke 22 is used at the trailer end of cable 14 of larger size or diameter than the round opening in bracket 17 or if made so that it cannot pass therethrough in assembling and disassembling the parts. The opposite or tractor end of tube 15 is also provided with a screw-threaded coupling member 23 rigidly united therewith, but this member has an annular flange or shoulder 24 at its outer end adapted to rotate within and against a hollow sleeve or thimble 25 which is removably held within a relatively large round opening 26 within bracket 16, and a spring-pressed locking pin 27 is mounted vertically within a boss 28 at one side of bracket 16 so that said pin will engage a notch in the side of thimble 25 and lock it within the bracket. Any suitable locking device may be used but to permit quick detachment and attachment of the tube I show and prefer to use a pin having a pivoted locking key 29 within its slotted bottom end, together with a coil spring 30 between the head of the pin and boss 28. To remove the pin it is only necessary to press the pin downwardly against the tension of the spring and then turn key 29 parallel with the axis of the pin so that the pin may be withdrawn from boss 28, and the sleeve 25 may be withdrawn bodily from the front side of the bracket together with the cable and its turn buckle 32 and connecting screw 33, the turn-buckle being of such size or width that it will pass freely through the large opening 26 in bracket 16. Coupling member 23 of tube 15 is held in swiveled connection with thimble 25 by means of a nut 34, and any straightening movement of tube 15 induced by pull on cable 14 is resisted by nut 34 at the bracket end of said tube, while the same effect is obtained at the opposite or trailer end of the tube by the enlarged flange or shoulder 19 on coupling member 18. Turn buckle 32 is used to take up all slack or play in cable 14, and to prevent twisting of the cable in turning the turn buckle the connecting end of the cable is provided with a coupling member 36 having swiveled union with the turn buckle. A nut 37 on the turn-buckle screw 33 serves to lock the turn buckle member 32 from independent rotation except when the parts are being adjusted. The outer end of screw 33 is forked and is pivotally connected with an operating arm or lever 38, and a quick detachable pivot pin or bolt 39 is preferably employed to connect the parts together. Pin or bolt 39 corresponds with or is of the same kind as locking bolt 27, and when the turn buckle screw 33 is disconnected from arm 38 and locking bolt 27 has released thimble 25 the coupling tube 15 and pulling cable 14 may be jointly removed or bodily withdrawn with their associated parts through the open end of bracket 16.

The trailer end of cable 14 is pivotally secured by yoke 22 to a short link 40 which is adjustably fastened in rigid connection with a slotted arm 41 by a clamping bolt 42, and a brake rod 43 connects the lower free end of arm 41 with a crank arm 44 for the brake or clutch 12 on the trailer. This brake rod may connect with or operate any number of clutches or brakes on either the front or rear wheels or both wheels of a single trailer or a plural number of trailers, and adjustment of link 40 lengthwise in the slot in arm 41 will increase or decrease the arc movement of arm or lever 41 and the operating throw of the brake rod, thus permitting the braking action of the trailer brake to be properly timed to co-act with the brakes on the tractor or forward vehicle. In practice the trailer brakes are set to operate slightly in advance of the tractor brakes to prevent the trailer from whipping or skidding, and the device described acts in that manner and permits quick and accurate adjustments to be made in coupling up a tractor and trailer and in taking up wear. Any slack in the cable and excess play in the operating connections is taken up by the turn-buckle, while the unlocking action of the brakes and their operating parts is effected as usual by springs connected with the brakes, or with the equalizer shafts, actuating arms, or other operating parts.

What I claim is:

1. A tractor and trailer coupled together for turning and undulating movements having a flexible power-applying element extending from one to the other, and a swiveled compensating coupling tube between said tractor and trailer adapted to keep said flexible element taut in applying power.

2. A wheeled tractor and trailer and a draw bar coupling therefor, an operating and operable member on said tractor and trailer respectively having a flexible connecting element united therewith and extending on flexed lines between said tractor and trailer, and a flexible tube detachably coupled to said tractor and trailer in counteracting engagement with the flexible portion of said element.

3. A tractor and trailer and a coupling uniting them for turning and vacillating movements, a tubular member flexed between said tractor and trailer and detachably coupled therewith, and operating and operable members mounted upon said tractor and trailer respectively, having flexible connecting means extending through the flexed portion of said tubular member in counteracting engagement with the inner walls thereof.

4. A tractor and trailer having draw coupling connections, braking mechanism for said trailer having operating means mounted upon said tractor including a flexible operating connection flexed between said tractor and trailer, and a flexed tubular member embodying a metal spiral in detachable coupling connection with said tractor and trailer adapted to oppose straightening movements of the flexed portion of said flexible operating connection.

5. A wheeled tractor and trailer having a draw coupling, brake mechanism mounted upon said tractor and trailer having operating means including a flexble operating element flexed between said tractor and trailer, and a flexed tubular member of closely coiled wire confining the flexed portion of said element having swiveled coupling connection with said tractor and trailer.

6. A wheeled vehicle and trailer pivotally connected together, braking devices for the wheels of said vehicles having operating connections comprising a swiveled element flexed between said vehicles, a flexed stiff wire conduit for said element adapted to act counter to the straightening movements of said element, and means adapted to anchor the opposite ends of said conduit in free rotatable connection with said vehicles.

7. A pair of wheeled vehicles in coupling connection, each having braking devices for the wheels thereof; means uniting said respective braking devices for common movement comprising a flexed element adapted to compensate for turning and undulating movements of said vehicles, a flexed compensating coupling tube of tightly coiled wire between said vehicles adapted to counteract straightening movements of said flexed element, and an adjustable device associated with said brake operating means adapted to vary the operation of said braking devices on the respective vehicles.

8. Brake operating means for wheeled vehicles in tractor connection, comprising a flexible element having a turn-buckle adapted to take up slack therein, a flexed compensating tube engaged with a flexed portion of said element, and end couplings adapted to secure the tube to the meeting ends of two vehicles.

9. A brake operating coupling for wheeled vehicles in tractor connection, comprising a flexed compensating tube of tightly coiled wire, flexible brake operating means extending through said tube, a swiveled coupling and anchoring member for one end of said tube and a quick-detachable coupling and anchoring member for the opposite end of said tube.

10. Brake operating mechanism for tractor and trailer vehicles, comprising a tubular coil of wire having coupling members at its opposite ends, brackets adapted to receive said coupling members and to sustain said tubular coil in a flexed state, a set of pivoted arms having a flexible connection extending taut therebetween through said flexed coil.

11. Brake operating mechanism for vehicles in tractor connection, comprising separate brackets adapted to be fixed to the frames of sad vehicles, a tubular coil of wire having shouldered terminals at its opposite ends, means adapted to detachably affix said terminals in swiveled connection with said brackets, an operating element and an operable member having a cable connection extending through said tubular coil, adjustable means adapted to stretch said cable taut between said operating element and operable member, and means adapted to connect said cable adjustably to said operable member to vary the movement thereof.

12. A brake operating coupling for a tractor and trailer, comprising a set of brackets, a flexed tube having swiveled union with said brackets, a brake actuating cable extending through said tube, and separable couplings adapting said tube and cable to be jointly removed from said brackets.

13. A pair of pivotally-connected vehicles having separate wheel braking devices, actuating means for the braking devices on one vehicle having a flexible pulling element connected with the braking device on the other vehicle, and a flexible tube of closely-wound wire flexed between and detachably coupled in swiveled connection to said vehicles in constant counteracting engagement wth a flexed portion of said pulling element.

ADOLPH W. LIEBERMAN